UNITED STATES PATENT OFFICE.

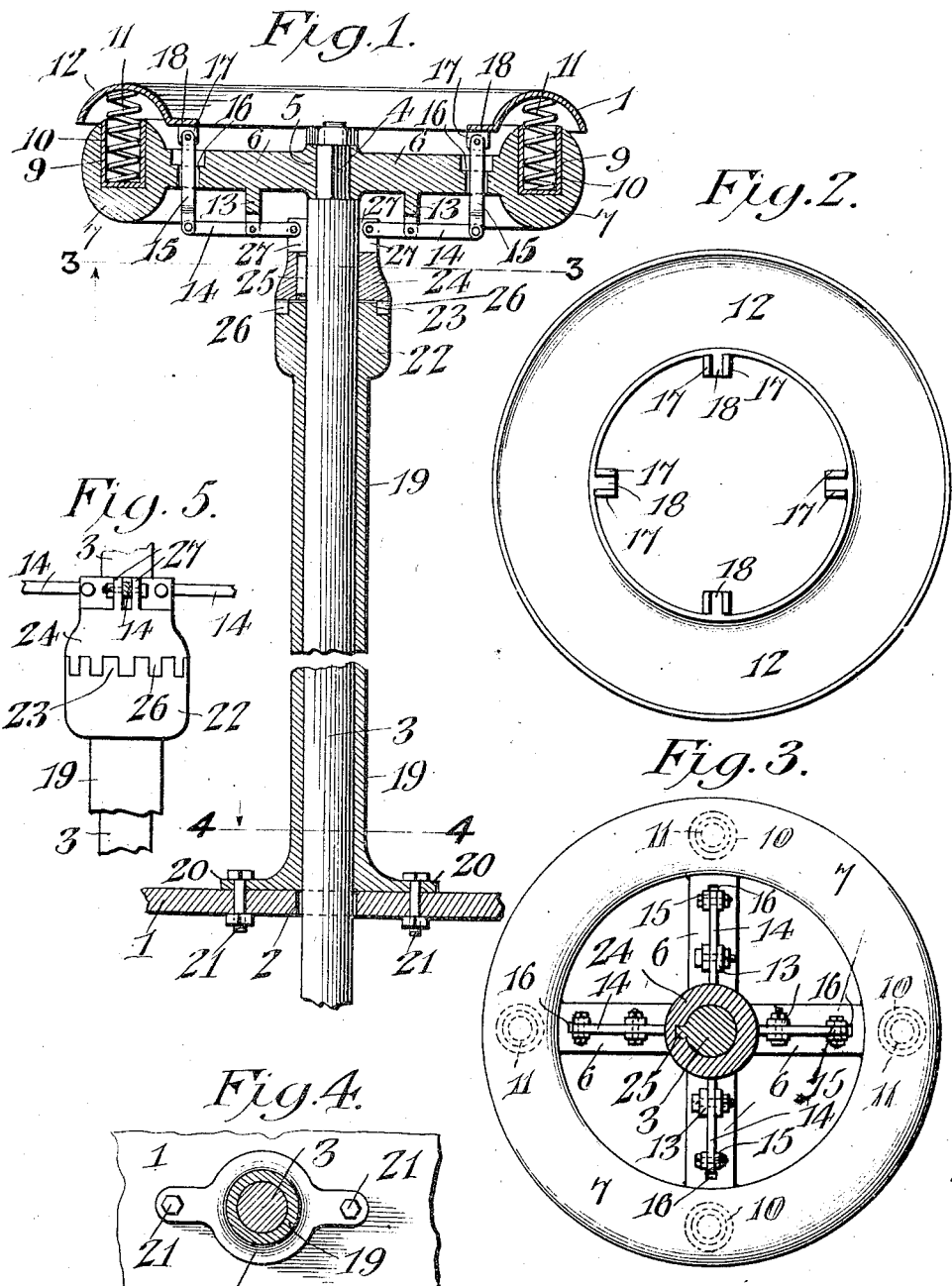

GEORGE FRANCIS GARRITY, OF SCRANTON, PENNSYLVANIA.

STEERING-HEAD FOR VEHICLES.

1,026,504.　　　　　Specification of Letters Patent.　　Patented May 14, 1912.

Application filed February 6, 1911. Serial No. 606,993.

*To all whom it may concern:*

Be it known that I, GEORGE F. GARRITY, a citizen of the United States, residing at Scranton, in the county of Lackawanna and State of Pennsylvania, have invented a new and useful Steering-Head for Vehicles, of which the following is a specification.

This invention has reference to improvements in steering heads for vehicles, and its object is to provide a means whereby the steering head will become automatically locked when released by the operator, so that should the operator accidentally or purposely release the steering head the vehicle will continue the course it was pursuing and any danger of the vehicle swerving because of the lack of control of the steering head is avoided.

While the device is designed more particularly for use with steering wheels such as are commonly employed in automobiles, the invention may be used with other types of steering apparatus.

In accordance with the present invention the steering pillar at the end of which the steering wheel is located traverses a hollow fixed post terminating in teeth or other suitable engaging means, and a companion member is carried by the pillar in operative relation to the toothed end of the hollow post, while the steering wheel is provided with a grip member connected to the coacting toothed member, which latter forms one member of a clutch of which the other member is the toothed end of the hollow post. The grip carried by the steering wheel is coextensive therewith and has a normal tendency away from the wheel, this tendency being exerted in a direction to bring the clutch members into engagement. When the steering wheel is grasped by the operator, the grip member yields readily and the clutch member carried by the steering pillar is moved away from the clutch member carried by the post, so that the wheel may be manipulated in the usual manner to steer the vehicle, springs being interposed between the grip member and the steering wheel, but these springs may be of a light character not obtrusive to the operator. By this means should the operator from any cause release the hold on the steering wheel, the grip member will at once move to a position causing the clutch members to engage, whereby the steering wheel is held in the position it had under the hand of the operator and the vehicle will continue in the course it was traveling and even if an obstruction, such as would ordinarily cause a swerving of the vehicle, be met by the wheels, the fixed condition of the steering head will prevent any change of relation of the wheels to the vehicle, and the latter will continue its course as before, until the operator may again assume control of the wheel, when by the grasping action of the hand of the operator on the wheel, the latter is released from its clutched condition and may be manipulated as necessary for the steering of the vehicle.

The invention will be best understood from a consideration of the following detailed description, taken in connection with the accompanying drawings forming a part of this specification, with the understanding, however, that while the showing of the drawings is that of a practical embodiment of the invention, the latter is susceptible of other embodiments, while still retaining its salient features.

In the drawings:—Figure 1 is a diametric section of the steering head in the direction of its longitudinal axis, with parts in elevation. Fig. 2 is an inverted plan view of the grip member applied to the steering head. Fig. 3 is a section on the line 3—3 of Fig. 1 viewing the steering head from below considering the ordinary position of the steering head. Fig. 4 is a section on the line 4—4 of Fig. 1. Fig. 5 is an elevation of the clutch members with surrounding parts omitted.

Referring to the drawings, there is shown a support 1 which may be considered as a fixed portion of the body of a vehicle, say that portion through which the steering pillar passes, and the part 1 may be taken as indicative of an automobile or other vehicle. This member 1 is provided with a passage 2 for a steering pillar 3, which is usually in the form of a shaft of appropriate length, and will be understood as connected to the steering wheels of the vehicle, although the connections have been omitted in the drawings as unnecessary for an understanding of the invention. The pillar 3 is usually squared at the outer end as indicated at 4, and traverses a matching opening in a hub 5 having spokes 6 carrying at their outer ends a rim 7, such as is usually provided in automobiles, the rim 7 with the spokes 6 and hub 5 constituting a steering wheel.

The rim 7 is shaped for convenient grasping by the hand of the operator, and in that portion which may be termed the upper or outer portion of the rim there is provided a suitable number of sockets 9, each of which holds a cup 10 housing one end of a spring 11 which may be an ordinary coiled spring, and of a sufficient length so that under its normal expansion one end will extend above or beyond the open end of the cup 10. In the particular arrangement indicated in Fig. 3, four such springs are employed in equi-distant arrangement, but it will be understood that the invention is not confined to any particular number of springs. Overriding the rim 7 is an annular grip member 12 concaved on one surface in conformity with the rounded contour of the rim 7 and convexed on the other surface to readily fit the hand of the operator, the grip member presenting a surface to the hand of the operator similar to the corresponding portion of the rim of the wheel. This grip member is abutted by the springs 10 holding the grip member in place relative to the corresponding portion of the rim 7 when the grip member is not moved toward the rim by the gripping action of the hand of the operator.

Each spoke is provided with a bifurcated stud 13 in which is pivoted a lever 14, one end of which latter, such end being the outer end, is pivotally connected to a link 15 extending through a passage 16 formed in the spoke near the rim 7, the end of the link remote from the lever being pivoted between ears 17 formed on an inwardly extending tongue 18 on the inner edge of the grip member 12. In the particular structure shown there are four spokes and four levers and links, and the grip member 12 is provided with four tongues 18, each of which has a pair of ears 17. However, it will be understood that the invention is not limited to the exact number of members described, but may have a greater or lesser number.

The pillar 3 is surrounded by a hollow post 19 formed with a foot 20, which may be secured to the member 1 by suitable bolts 21 or in any other appropriate manner. The post 19 is of a less length than the distance between the member 1 and the end of the pillar when carrying the steering wheel, and at the end remote from the foot 20 is formed into an enlargement 22 provided at the end adjacent the steering wheel with a circular series of teeth 23, the teeth being in the present instance indicated as of the ordinary square contour, but may be of any other suitable form, such as are commonly used in clutch members, the enlargement 22 at the end of the post 19 constituting one member of a clutch. The other member of the clutch comprises a block 24 mounted on the pillar 3 between the enlargement 22 and the steering wheel and capable of sliding lengthwise of the pillar, being held against rotation with relation to the pillar by a spline or key 25 carried by the pillar. The block 24 is formed with a circular series of teeth 26 matching the teeth 23 and capable of entering between the teeth 23 when the block is moved into proper relation to the enlargement 22. The block 24 is formed at the end remote from the teeth 26 with pairs of ears 27, between which the corresponding ends of the levers 14 project, and to which these levers are pivotally connected. The parts are so proportioned that when the grip member 12 is forced away from the rim 7 by the action of the springs 11 the levers 14 are turned on their pivots by the links 15 in a direction to cause a movement of the block 24 toward the enlargement 22 of the post 19 until the teeth 26 are in locking engagement with the teeth 23 and because the block 24 is locked to the pillar 3 by the spline 25, the pillar 3 and steering wheel become locked to the fixed post 19, and in this position of the parts the steering pillar cannot turn with relation to the post 19 and consequently the steering wheels are in fixed relation to the vehicle, so far as their directing action is concerned.

When the operator grasps the steering wheel in the ordinary manner, the grip member 12 is moved toward the rim 7, compressing the springs 11 and through the links 15 and levers 14 the block 24 is moved away from the enlargement 22 until the teeth 26 are free from the teeth 23, when the steering wheel may be manipulated in the usual manner, the pillar 3 being then free from the post 19, and the vehicle may be steered without hindrance. Suppose that for any reason the operator either purposely or unintentionally releases the steering wheel, the reaction of the springs 11 immediately moves the gripping member 12 away from the rim 7 and through the links 15 and levers 14 causes a movement of the block 24 toward the enlargement 22 until the teeth 26 seat between the teeth 23, when the pillar 3 is locked to the fixed post 19 and the steering wheels are then in fixed relation to the vehicle, so far as the steering action is concerned, so that the vehicle is constrained to continue along the course it had been traveling, and should the wheels, while the operator is not controlling the steering head, come into contact with any obstruction, such wheels are not thrown to one side to cause a swerving of the vehicle any more than would occur were the operator's hand controlling the steering wheel. In fact there is less likelihood of the vehicle swerving by meeting an obstruction with the steering wheel locked than when only under the control of the operator. As soon as the operator again grasps the steering wheel it is readily unlocked by the ordinary action of the hand in grasping it, and the vehicle may then be controlled by the operator in the usual manner.

It will be observed that the grip member 12 is circular and covers that portion of the rim of the steering wheel presented toward the operator, so that in the act of grasping the steering wheel the fingers will engage that edge of the rim remote from the operator, while the thumb engages over the grip member 12, thus preventing any accidental pinching of the fingers as might occur were the grip member beneath the rim 7, that is on the side thereof remote from the operator. The grip member is always in position to be readily grasped by the hand of the operator whatever may be the position of the wheel with reference to its rotative movement and pressure applied at any point about the grip member will, because of the several lever and link connections with the clutch member, cause the grip member to move toward or from the rim at all points simultaneously.

While the springs have been shown as carried by cups 10, it will be understood that these cups may be omitted.

What is claimed is:—

1. In a steering head for vehicles, a steering wheel, a steering pillar, an annular grip member carried by the steering wheel with springs interposed between said grip member and the rim of the steering wheel, a clutch having one member connected directly to the steering pillar for rotation therewith, and another member fixedly connected to a non-rotatable part of the vehicle, and connections between the grip member and the member of the clutch carried by the pillar.

2. In a steering head for vehicles, a steering wheel, springs carried by the rim of the steering wheel on the side thereof toward the operator, an annular grip member carried by the springs, a clutch for connecting the steering wheel to a fixed part of the vehicle, and connections between the grip member and the clutch, said connections comprising a series of levers carried by the wheel in radial relation thereto and each connected at one end to a clutch, and link members each connected at one end to a respective lever and at the other end to the grip member.

3. In a steering head for vehicles, a steering pillar, a steering wheel at one end of said steering pillar, a hollow post traversed by the pillar and fixed with reference thereto, said post terminating at the end toward the steering wheel in a clutch head, a clutch block rotatable with the steering pillar and carried by the latter in operative relation to the clutch head on the pillar, a series of levers carried by the steering wheel and each connected at one end to the clutch block, a link for each lever extending through the steering wheel to the side thereof remote from the lever, a circular grip member on the side of the steering wheel remote from the clutch, said grip member being connected to the links at the ends thereof remote from the levers, and springs interposed between the grip member and the steering wheel and tending normally to move the grip member away from the steering wheel.

4. In a steering head for vehicles, a steering pillar, a steering wheel at one end of said steering pillar, a hollow post traversed by the pillar and fixed with reference thereto, said post terminating at the end toward the steering wheel in a clutch head, a clutch block rotatable with the steering pillar and carried by the latter in operative relation to the clutch head on the pillar, a series of levers carried by the steering wheel and each connected at one end to the clutch block, a link for each lever extending through the steering wheel to the side thereof remote from the lever, an annular grip member of concavo-convex cross section having tongues and ears on the inner edge connected to the ends of the links remote from the levers, the grip member conforming to the shape of the steering wheel, and springs interposed between the steering wheel and the concaved face of the grip member.

In testimony that I claim the foregoing as my own, I have hereto affixed my signature in the presence of two witnesses.

GEORGE FRANCIS GARRITY.

Witnesses:
 Thos. Garrity,
 Jas. A. O'Malley.